United States Patent [19]

Pastecki et al.

[11] Patent Number: 5,391,230
[45] Date of Patent: Feb. 21, 1995

[54] APPARATUS FOR HOLDING SOLID COMPACT MEDICAMENTS DURING PROCESSING

[75] Inventors: Peter A. Pastecki, Rochester; Thomas C. Reiter, Hilton; Charles W. Pierson, Rochester, all of N.Y.

[73] Assignee: Eastman Kodak Company, Rochester, N.Y.

[21] Appl. No.: 88,467

[22] Filed: Jul. 7, 1993

[51] Int. Cl.$^6$ .................. B05C 13/00; B25B 1/20; B23Q 3/00; A61K 9/00
[52] U.S. Cl. ...................... 118/503; 269/43; 269/156; 269/254 CS; 269/287
[58] Field of Search ............ 118/500, 503; 269/43, 269/268, 254 CS, 156, 287; 427/3

[56] References Cited

U.S. PATENT DOCUMENTS

| | | | |
|---|---|---|---|
| 1,869,073 | 7/1932 | Miller | 269/287 |
| 2,155,444 | 4/1939 | Pittenger et al. | 167/83 |
| 2,596,176 | 5/1952 | Scherer | 117/43 |
| 2,982,234 | 5/1961 | Ackley et al. | 197/54 |
| 3,173,839 | 3/1965 | Nicholson | 167/82 |
| 3,195,770 | 7/1965 | Robertson | 220/23.6 |
| 3,315,637 | 4/1967 | Taylor | 118/503 |
| 3,463,645 | 8/1969 | Kane | 106/30 |
| 3,472,367 | 10/1969 | Hellstrom | 206/56 |
| 3,475,187 | 10/1969 | Kane | 106/22 |
| 3,606,007 | 9/1971 | Huston, Jr. | 206/73 |
| 4,011,949 | 3/1977 | Braber et al. | 206/532 |
| 4,339,428 | 7/1982 | Tencza | 424/21 |
| 4,429,792 | 2/1984 | Machbitz | 206/531 |
| 4,432,455 | 2/1984 | Savoir | 206/531 |
| 4,543,138 | 9/1985 | Bollinger et al. | 156/69 |
| 4,656,066 | 4/1987 | Wittwer | 428/35 |
| 4,661,367 | 4/1987 | Forse et al. | 427/3 |
| 4,669,416 | 6/1987 | Delgado et al. | 118/503 |
| 4,741,441 | 5/1988 | Keffeler | 206/532 |
| 4,807,421 | 2/1989 | Araki et al. | 269/287 |
| 4,824,085 | 4/1989 | Büchler | 269/139 |
| 4,889,236 | 12/1989 | Bartell et al. | 206/531 |
| 4,921,108 | 5/1990 | Berta | 209/625 |
| 4,965,089 | 10/1990 | Sauter et al. | 427/3 |
| 4,990,358 | 2/1991 | Berta | 427/3 |
| 5,006,362 | 4/1991 | Hilborn | 427/3 |
| 5,019,124 | 5/1991 | Flugger | 206/45 |
| 5,137,263 | 8/1992 | Saudie et al. | 269/287 |

FOREIGN PATENT DOCUMENTS

| | | | |
|---|---|---|---|
| 197810 | 4/1908 | Germany | 14/10 |
| 2150454 | 10/1972 | Germany | . |
| 337019 | 2/1936 | Italy | . |
| 1375069 | 7/1972 | United Kingdom | B65G 31/04 |

Primary Examiner—Robert J. Warden
Assistant Examiner—Christopher Y. Kim
Attorney, Agent, or Firm—Carl F. Ruoff

[57] ABSTRACT

An apparatus for capturing and holding a solid compact medicament, such as a caplet, has first, second and third members each having a surface having at least one throughole therein. Throughholes have a diameter somewhat greater than the thickness of the solid compact medicament and the interior wall of the throughholes 1as an axial length smaller than the length of the solid compact medicament. First and third members are fixed relative to one another. Second member is displaceable between first and third members between a first position wherein the throughholes in members are aligned thereby defining an open gripping jaw for receiving and subsequently releasing the solid compact medicament, to a second position wherein the second member firmly engages a circumferential portion of solid compact medicament thereby engagingly capturing solid compact medicament in partially closed gripping jaw for processing.

11 Claims, 5 Drawing Sheets

APPARATUS FOR HOLDING SOLID COMPACT MEDICAMENTS DURING PROCESSING

FIELD OF THE INVENTION

The invention relates to an apparatus for holding a solid compact medicament during processing. More particularly, the invention concerns a solid compact medicament holding apparatus in which overlapping portions of the medicament, such as a caplet, are exposed to a coating process to produce a coated solid compact medicament which resembles a conventional capsule.

BACKGROUND OF THE INVENTION

In the marketing of solid compact medicaments, there is a clear consumer preference for a shiny, capsule-like, single or multiple color solid dosage form that is easy to swallow. Generally, gelatinous coatings have been used to achieve a shiny surface on a solid dosage form, also referred to herein as a caplet, pill, tablet, and the like. Caplets are solid, substantially cylindrical shaped medicaments; pills are solid, substantially round shaped medicaments; and, tablets are solid, substantially spherical shaped medicaments (see for reference Seitz et al., "Tablet Coating", Chapter 12, Page 346, The *Theory and Practice of Industrial Pharmacy*). One method of making caplets which has been used to meet the needs of the pharmaceutical consumer is described and illustrated in U.S. Pat. No. 4,965,089 to Sauter et al, and U.S. Pat. Nos. 4,990,358 and 4,921,108, both to Berta et al. In particular, Sauter '089 and Berta '358 each teaches a method and apparatus for holding and dipping one end portion of a caplet into a gelatin pool and then positioning the caplet so as to dip the uncoated end portion of the caplet into a second gelatin pool of a different color. However, a major drawback of the apparatus and methods taught in these patents is that a constant force spring is relied upon to hold the caplet during the dip coating process and also during caplet transfer to other processing steps, such as drying and packaging. As can be readily appreciated, such a constant spring force could impart a shear force which would be unacceptably large on some abrasion sensitive material included in solid compact medicaments. Acetyl salicylic acid, also known as aspirin, and gelatinous coatings which have not been completely cured, are two examples of abrasion sensitive materials which could be damaged by such shear force.

Furthermore, since existing caplet holders generally rely upon a constant force spring for holding the caplet, they require some sort of mechanical force to load the caplet into and discharge the caplet from the holder, thereby potentially compromising the integrity of the caplet material. For instance, Sauter '089 and Berta '108, each teaches a caplet loading device having a caplet feeder associated with a plunger assembly for mechanically loading and unloading caplets.

Accordingly, there persists a need for a reliable, relatively low maintenance apparatus having few moving parts for holding and releasing a solid compact medicament during processing which does not impart an unacceptably large shearing force on the solid compact medicament, subject the solid compact medicament to lubricant contamination, nor rely upon excessive forces to release the solid compact medicament from the apparatus.

SUMMARY OF THE INVENTION

It is, therefore, the object of the invention to overcome the shortcomings of the prior art. Accordingly, for accomplishing these and other objects of the invention, there is provided, in one aspect of the invention, an apparatus for holding a solid compact medicament, having a thickness and length, during processing comprising first, second and third members, each member having a surface with at least one throughole therein. Each of the throughholes has a diameter somewhat greater than the thickness of the solid compact medicament and the interior wall of the throughole has an axial length less than the length of the solid compact medicament. Further, the first member is substantially parallel and fixed relative to the third member so that throughholes in the first and third members are correspondingly aligned. The second member is displaceable between the first and third members from a first to a second position. In the first position, the correspondingly aligned throughholes in the first and third members are in alignment with the throughole in the second member, the aligned throughholes defining an open gripping jaw for receiving and subsequently releasing the solid compact medicament from the first, second and third members. In the second position, the throughole in the second member is misaligned relative to correspondingly aligned throughholes in the first and third members wherein the interior wall of the second member engages a circumferential portion of the solid compact medicament thereby correspondingly forcing the solid compact medicament into capturing engagement with the interior walls of the throughholes in the first, second and third members.

In another aspect of the invention, the apparatus comprises in addition to the above features, a stop plate positionable beneath the gripping jaw so that an end portion of the solid compact medicament comes into stopping engagement therewith. Also, a movable bar-like member is positionable above the gripping jaw for initiating disengagement of caplet from the gripping jaw.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE DRAWINGS

Turning now to the drawings, and more particularly to FIGS. 1-5, there is shown apparatus 10 for holding a solid compact medicament (A), such as a caplet, during processing. Processing of caplets, i.e., the uncoated solid dosage form, generally involves coating (typically dipping or spraying) at least a portion of the caplet. Often one or more layers of clear or colored materials are used in the coating process, for instance, gelatinous materials such as methyl cellulose, calcium alginate or gelatin (See Berta '771). The coated caplet then must be dried and packaged. When one or more coating materials are to be applied to different portions of the caplet, for instance different colored materials on opposite end portions of the caplet, processes are required for exposing and then coating the uncoated caplet end portion are required. This generally will involve either forcing the caplet through a collet in the manner described in the prior art devices of both Sauter '089 and Berta '358 or, inverting the apparatus of the present invention, as more fully described below, and allowing the caplet to fall freely to a predetermined stop thereby exposing an uncoated portion of the caplet.

Figure 1:
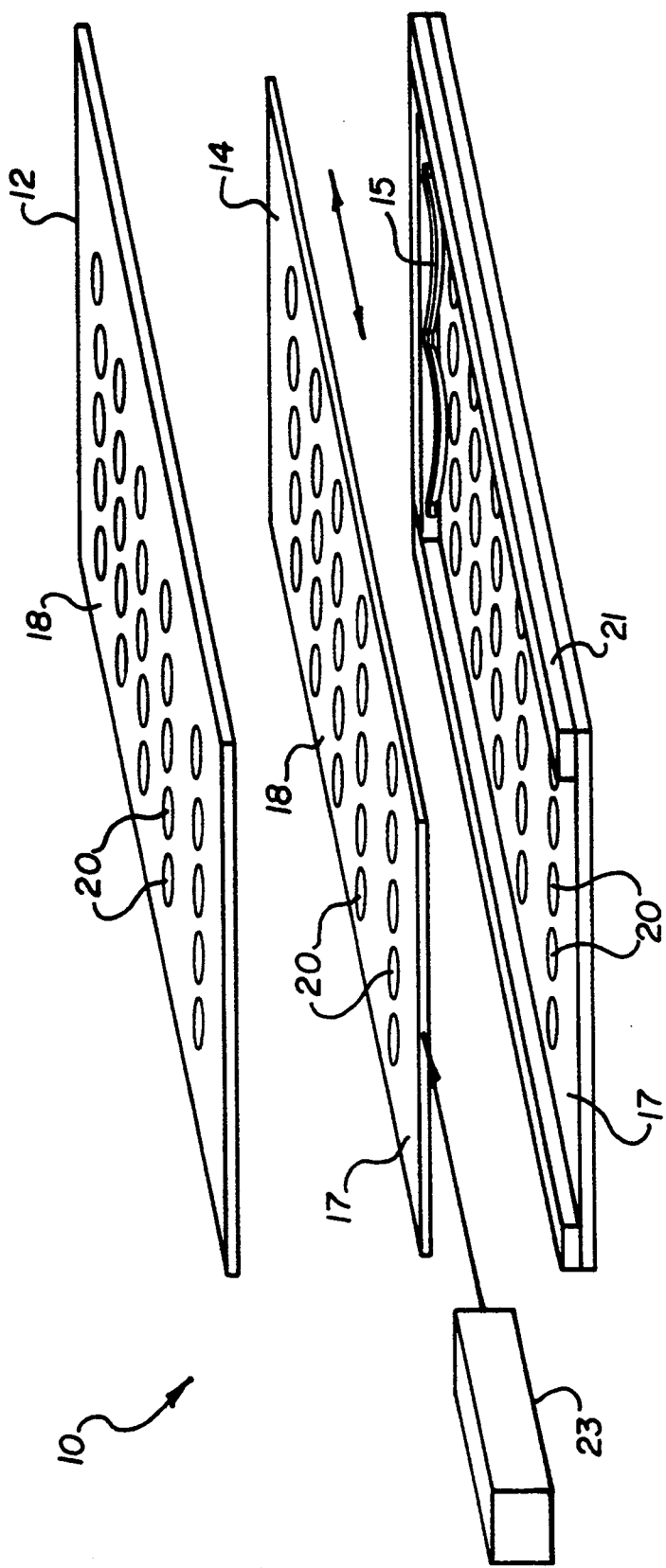
FIG. 1 is an exploded perspective view of the apparatus according to the principles of the invention.
Figure 2:
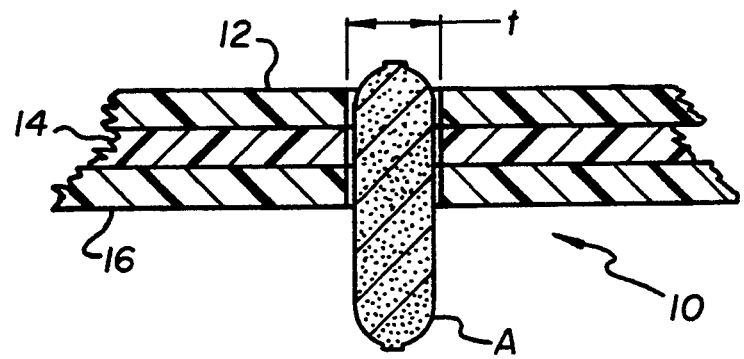
FIG. 2 is a cross sectional view of the apparatus showing the first, second and third members having throughholes correspondingly aligned.

According to FIG. 1, apparatus 10 of the invention broadly comprises first, second, third members 12,14,16 each comprising a surface 18 having at least one throughhole 20. First and third members are fixed in housing 21 relative to movable second member 14, described more fully below. Movable member 14 slides along a fixed axis in housing 21 between members 12,16. Alternatively, member 14 may rotate about an axis between first and third members 12,16 (not shown). In the preferred embodiment, a tension spring 15 mounted in a portion of housing 21 cooperates with first drive means 23 for biasing movable plate 14, as described further below. Throughholes 20 in first, second and third members 12,14,16 have diameters (d) somewhat greater than the thickness (t) of the solid compact medicament (A) defining a clearance that enables solid compact medicament (A) to pass freely therethrough (FIG. 2). Moreover, the throughholes 20 have an interior wall 22 (shown in FIG. 4) having an axial length (1) less than the length (L) of the solid compact medicament to enable a portion of the solid compact medicament (A) to be exposed during processing, as further described below. It is preferable that the total length (L) of members 12,14,16 is generally less than about one-half the length of the solid compact medicament. An overall thin interior wall 22 thickness favor reduced weight, ease of cleaning and storage, and a generally more economical apparatus 10.

Turning further to FIG. 2, second member 14 is shown in a first position wherein throughholes 20 in first 12, second 14, and third 16 members are correspondingly aligned thereby defining an open gripping jaw 24 for receiving and subsequently releasing the solid compact medicament (A).

Figure 3:
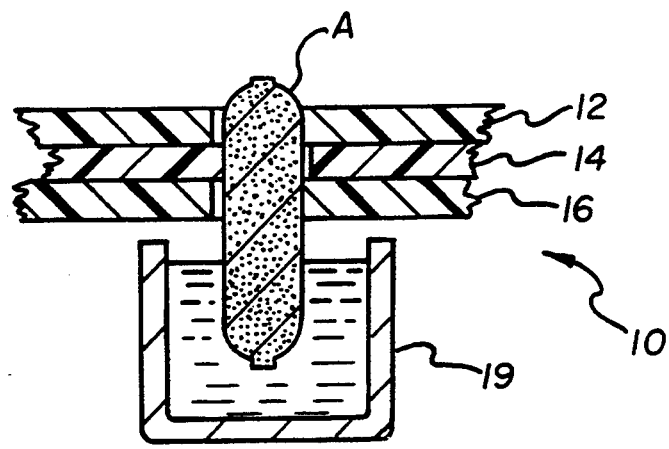
FIG. 3 is a cross sectional view of the apparatus showing the second member in a misaligned relationship relative to the first and third members.
Figure 4:
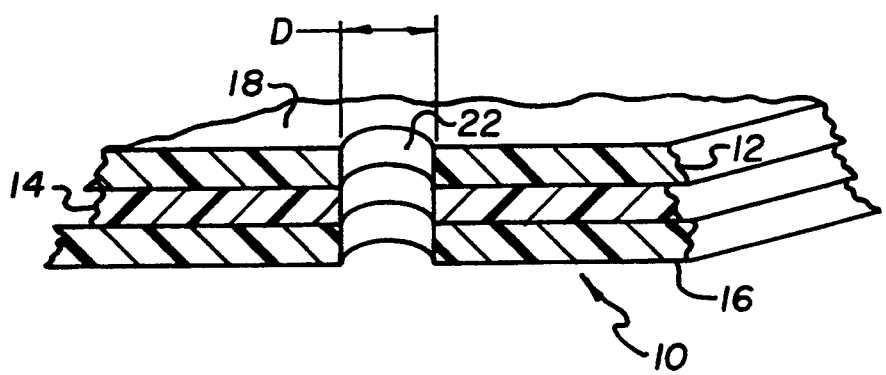
FIG. 4 is an isometric sectional view of the apparatus showing the interior walls of the gripping jaw.

FIG. 3 shows a solid compact medicament (A) captured in a partially closed gripping jaw 24 and having an exposed portion disposed for processing, for instance, in a coating vat 19. Partially closed gripping jaw 24 is defined by second member 14 being displaced by cooperating first drive means 23 and spring member 15 to a second position wherein throughholes 20 in second member 14 are misaligned relative to corresponding throughholes 20 in first and third members 12,16. Practically any means for displacing member 14 from a first to a second position may be used, although first drive means 23 (illustrated in FIG. 1), such a pneumatic motor, is preferred. More particularly, misalignment of second member 14 relative to first and third members 12,16 causes interior walls 22 of throughholes 20 in the second member 14 to engage a circumferential portion of solid compact medicament (A). Thus, in the second position, gripping jaw 24 partially closes and thereby forces solid compact medicament (A) into capturing engagement with interior walls 22 of first, second and third members 12,14,16.

Figure 5:
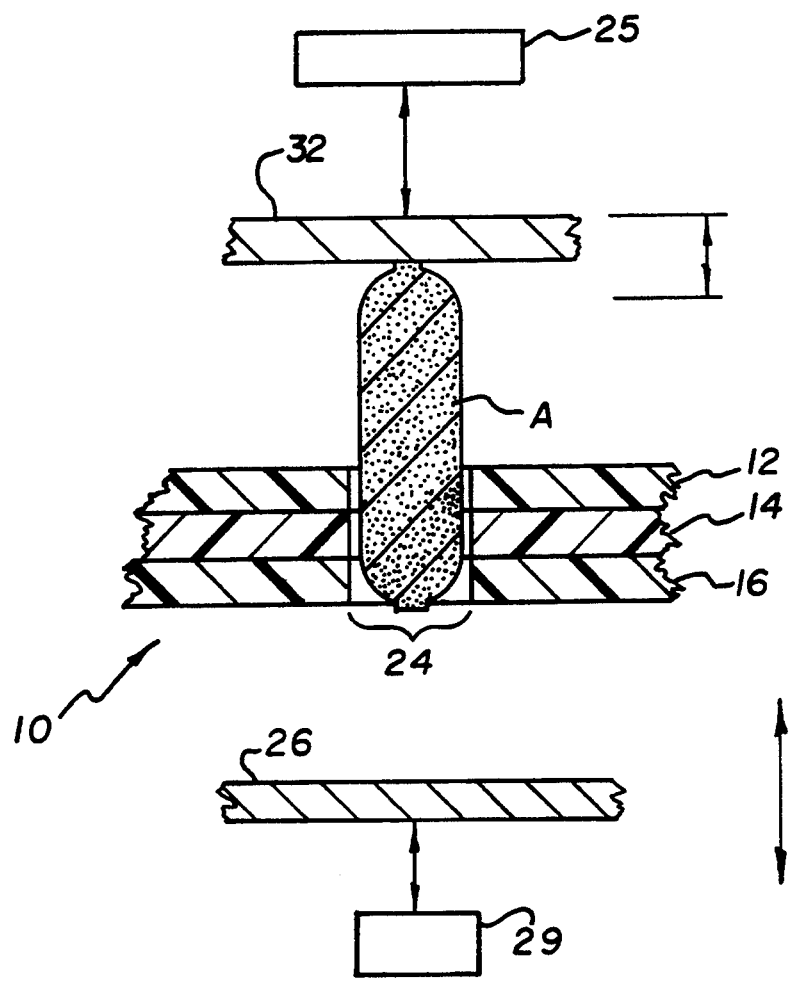
FIG. 5 is a cross sectional view of the alternative embodiment of the apparatus of FIG. 1 showing the a caplet urging means and a stop plate.
Figure 6:
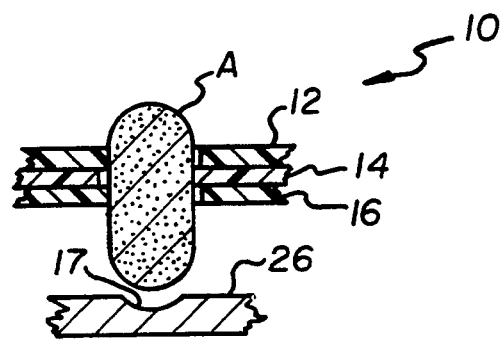
FIGS. 6 & 7 are enlarged section views of the apparatus showing an alternative stop plate having a surface depression.
Figure 7:
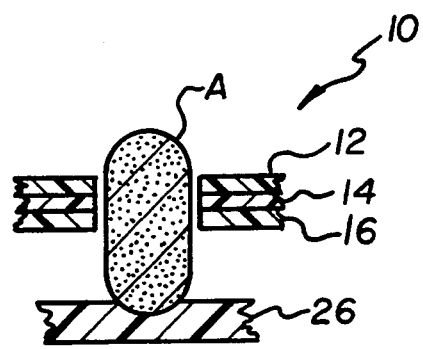

Turning to FIGS. 5-7, in another embodiment of the invention, apparatus 10 is shown comprising means for both precisely positioning a predetermined portion of the caplet (A) for processing and for initiating disengagement of caplet (A) from gripping jaw 24. Preferably, a stop plate 26 positionable beneath the lengthwise axis of gripping jaw 24 is provided so that caplets or solid compact medicaments of various lengths and coating formats can be accommodated. Moreover, stop plate 26 preferably comprises a depression 17, correspondingly shaped to an end portion of the solid compact medicament (A) and, alignably positioned beneath the gripping jaw 24 for resisting lateral movement or bouncing of the caplet upon contact with stop plate 26, as shown in (FIGS. 6 & 7). According to FIG. 6, caplet (A) in closed gripping jaw 24 is positioned above depression 17 prior to being released from the gripping jaw 24. After being released from gripping jaw 24, an end portion of caplet (A) comes to rest in depression 17 thereby exposing a predetermined potion (1) of caplet (A) for processing as shown in FIG. 7. Further, stop plate 26 is movably adjustable, preferably under the influence of second drive means 29, relative to gripping jaw 24. To initiate disengagement of caplet (A) from gripping jaw 24, if required due to sticking etc., a movable bar-like member 32 is preferably used. In operation, bar-like member 32 (FIG. 5), positionable above the gripping jaw 24, is brought into pressing contact, preferably under the influence of third drive means 25, with an end portion of solid compact medicament (A) thereby initiating downward displacement of solid compact medicament (A) through gripping jaw 24. Those skilled in the art will appreciate that other means may be used for initiating displacement of solid compact medicament (A) downwardly through gripping jaw 24, such as, by vibration means, air pressure or vacuum.

Figure 8:
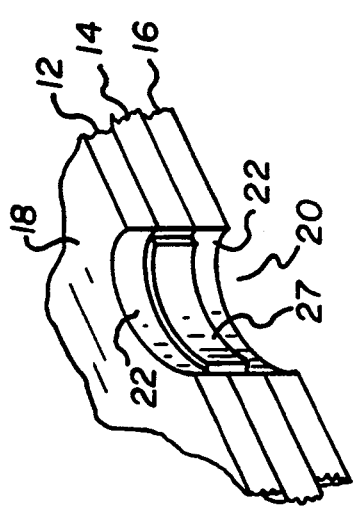
FIG. 8 is an enlarged isometric view of the throughole containing a compliant material layer.
Figure 9:
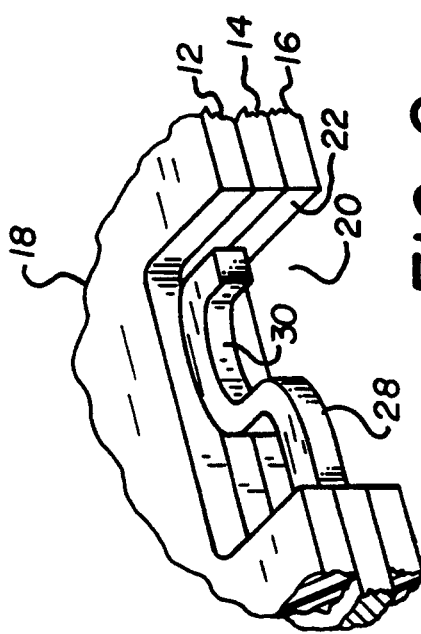
FIG. 9 is an enlarged isometric view of the throughole with an alternative retaining means therein; and, FIG. 10 is an enlarged isometric view of the througholes with yet another alternative retaining means therein.
Figure 10:
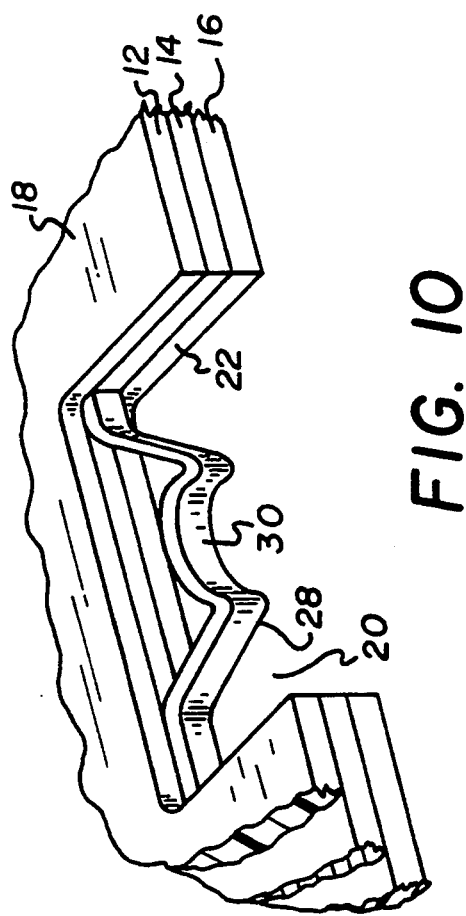

FIGS. 8-10 show an enlarged throughhole 20 of an alternative embodiment of apparatus 10. According to FIG. 8, throughhole 20 comprises a layer 27 of compliant material lined on interior wall 22. Compliant material layer 27 is preferably adhesively mounted onto interior wall 22 or, it may be mounted by any suitable means, such as by clipping layer 27 onto interior wall 22. While just about any compliant material layer 27 within the definition of the invention may be used, the inventors generally prefer a moldable thermoplastic rubber material, such as Santoprene ® made by Monsanto Corporation of St. Louis, Mo. Alternatively, according to FIGS. 9 & 10, throughholes 20 in at least one member 12,14, or 16 comprise a tension means, such as a flexible spring member 28, forming a cusp 30 for grasping a portion of solid compact medicament (A).

Accordingly, an important advantageous effect of the present invention is that it provides a reliable, low maintenance, economical apparatus for capturing and holding a solid compact medicament during processing without contaminating or damaging the solid compact medicament.

The invention has therefore been described with reference to certain embodiments thereof, but it will be understood that variations and modifications can be effected within the scope of the invention.

Having described our invention in sufficient detail to enable those skilled in the art to make and use it, we claim and desire to secure Letters Patent of the United States for:

1. Apparatus for holding a portion of a solid compact medicament, said medicament having a thickness and length, the apparatus comprising:

first, second and third members, each member having a surface with at least one throughole therein, each said throughole having a diameter [somewhat] greater than the thickness of said solid compact medicament and an interior wall having an axial length less than the length of said solid compact medicament; and, moving means for displacing said second member between said first and third members from a first position wherein said correspondingly aligned througholes in said first and third members are in alignment with said throughole in said second member, said aligned througholes defining an open gripping jaw for receiving and subsequently releasing said solid compact medicament from said first, second and third members; to a second position wherein said throughole in said second member is misaligned relative to said correspondingly aligned througholes in said first and third members and wherein said interior wall of said second member firmly engages a circumferential portion of said solid compact medicament thereby correspondingly forcing said solid compact medicament into capturing engagement with said interior walls of said througholes in said first, second and third members.

2. The apparatus recited in claim 1 further comprising means, cooperating with said gripping jaw, for precisely positioning a portion of the solid compact medicament for processing.

3. The apparatus recited in claim 2 wherein said positioning means is a stop plate spaced a predetermined distance from said gripping jaw.

4. The apparatus recited in claim 3 wherein said stop plate is provided with a depression aligned with the longitudinal axis of the solid compact medicament.

5. The apparatus recited in claim 4 wherein said depression is sized to accommodate an end portion of the solid compact medicament.

6. The apparatus recited in claim 3 wherein said stop plate is adjustable relative to said gripping jaw.

7. The apparatus recited in claim 1 further comprising means for initiating disengagement of the solid compact medicament from said gripping jaw.

8. The apparatus as recited in claim 7 wherein said initiating means is a bar member pressure.

9. The apparatus recited in claim 1 wherein at least one of said througholes is provided with means for compliantly engaging the solid compact medicament.

10. The apparatus recited in claim 9 wherein said compliant means is a rubber material.

11. The apparatus recited in claim 1 wherein said interior wall of said throughole in said second member is provided with a tension means mounted thereon defining a cusp for grasping a portion of said solid compact medicament.

* * * * *